(12) United States Patent
Myers et al.

(10) Patent No.: US 8,819,076 B2
(45) Date of Patent: Aug. 26, 2014

(54) DISTRIBUTED MULTIDIMENSIONAL RANGE SEARCH SYSTEM AND METHOD

(75) Inventors: Jesse Myers, San Francisco, CA (US); Scott Hotes, Berkeley, CA (US); Daniel Hodges, Berkeley, CA (US)

(73) Assignee: WaveMarket, Inc., Emeryville, CA (US)

( * ) Notice: Subject to any disclaimer, the term of this patent is extended or adjusted under 35 U.S.C. 154(b) by 229 days.

(21) Appl. No.: 12/850,975

(22) Filed: Aug. 5, 2010

(65) Prior Publication Data
US 2012/0036163 A1 Feb. 9, 2012

(51) Int. Cl.
*G06F 17/30* (2006.01)
*G06F 7/00* (2006.01)

(52) U.S. Cl.
CPC .... *G06F 17/30333* (2013.01); *G06F 17/30607* (2013.01); *G06F 17/30321* (2013.01)
USPC ............................ 707/802; 707/812; 711/173

(58) Field of Classification Search
CPC .................... G06F 17/30333; G06F 17/30327; G06F 17/30592; G06F 17/30336; G06F 17/30489
See application file for complete search history.

(56) References Cited

U.S. PATENT DOCUMENTS

| | | | |
|---|---|---|---|
| 6,460,026 B1 * | 10/2002 | Pasumansky | 707/737 |
| 6,931,418 B1 * | 8/2005 | Barnes | 707/776 |
| 7,167,856 B2 * | 1/2007 | Lawder | 1/1 |
| 7,356,549 B1 | 4/2008 | Bruso et al. | |
| 2002/0087570 A1 * | 7/2002 | Jacquez et al. | 707/100 |
| 2004/0083336 A1 * | 4/2004 | Stark et al. | 711/105 |
| 2006/0271281 A1 * | 11/2006 | Ahn et al. | 701/208 |
| 2008/0162510 A1 | 7/2008 | Baio et al. | |
| 2010/0287144 A1 * | 11/2010 | Cha et al. | 707/693 |
| 2012/0203745 A1 | 8/2012 | Myers et al. | |

OTHER PUBLICATIONS

Silvia Cristina Sardela Bianchi, "Load-balanced STructures for Decentralized Overlays", Oct. 2008, Universute de Neuchatel, pp. 1-171.*

Silvia Cristina Sardeia Bianci, "Load-Balanced Structures for Decentralized Overlays" Universite de Neuchatel, pp. 1-171, Oct. 29, 2008.

Decandia, Giuseppe et al., Dynamo: Amazon's Highly Available Key-value Store, 21st ACM Symposium on Operating Systems Principles, Oct. 14-17, 2007, Stevenson, Washington, USA.

(Continued)

*Primary Examiner* — Angelica Ruiz
(74) *Attorney, Agent, or Firm* — Dovas Law, P.C.

(57) ABSTRACT

A computer-implemented method is provided for managing a plurality of data objects including dimensional attributes. The method includes receiving a plurality of data objects including dimensional attributes and assigning each of a plurality of nodes to one or more of a plurality of keyspace positions of a keyspace, wherein the plurality of nodes define partitions of the keyspace. A space filling curve is applied to the dimensional attributes of each of the plurality of data objects to generate a plurality of key values which correspond to the plurality of keyspace positions, and each of the plurality of data objects is transmitted to one or more of the plurality of nodes assigned to a keyspace position corresponding to the key value of the respective data object. A system for managing a plurality of data objects including dimensional attributes is further provided.

26 Claims, 6 Drawing Sheets

(56) References Cited

OTHER PUBLICATIONS

Karger, David et al., Consistent Hashing and Random Trees: Distributed Caching Protocols for Relieving Hot Spots on the World Wide Web, Proceedings of the twenty-ninth annual ACM Symposium on Theory of Computing, May 4-6, 1997, El Paso, Texas, United States, pp. 654-663, 1997.

Wikipedia, Hilbert curve, http://en.wikipedia.org/wiki/Hilbert_curve, Wikimedia Foundation, Inc., Jun. 10, 2010.

Wikipedia, Z-order (curve), http://en.wikipedia.org/wiki/Z-order_%28curve%29, Wikimedia Foundation, Inc., May 1, 2010.

Rose, Nicholas J., Hilbert-Type Space-Filling Curves, http://www4.ncsu.edu/~njrose/pdfFiles/HilbertCurve.pdf, North Carolina State University, 2001.

White, Tom, Consistent Hashing, http://weblogs.java.net/blog/2007/11/27/consistent-hashing, Oracle Corporation, Nov. 27, 2001.

Kleinpeter, Tom, Programmer's Toolbox Part 3: Consistent Hashing, http://www.tomkleinpeter.com/2008/03/17/programmers-toolbox-part-3-consistent-hashing/, Mar. 17, 2008.

Karger, David et al., Web Caching with Consistent Hashing, Computer Networks, vol. 31, Issues 11-16, May 17, 1999, pp. 1203-1213.

Office Action dated Oct. 23, 2013 for U.S. Appl. No. 13/250,128.

Office Action dated May 12, 2014 for U.S. Appl. No. 13/250,128.

* cited by examiner

DISTRIBUTED MULTIDIMENSIONAL RANGE SEARCH SYSTEM AND METHOD

BACKGROUND

The problem of reliably storing and accessing large amounts of data has increasingly looked to distributed technologies, such as Distributed Hash Tables ("DHTs") and Amazon.com's Dynamo™ key-value store to scale across commodity hardware while preserving the high-availability requirements of demanding service level agreements ("SLAs").

In such systems, each data object is typically stored on multiple physical machines, also known as storage nodes, to provide redundancy against failure—and often also to improve performance. This model necessitates being able to determine which of the many storage nodes are responsible for a particular data object's storage. Commonly, this problem is solved by assigning each data object a key and then using a partitioning algorithm, such as consistent hashing, to choose a set of storage nodes.

The DHT model supports storing and retrieving data objects by key, which is sufficient for many problems, but not for spatial problems, such as finding all location tagged data objects within a specific geographic bounding region. More generally, DHTs do not naturally support range searches that restrict the search space by one or more of a data object's attribute dimensions.

Known systems are not configured to distribute data objects to nodes with regard to a data objects' dimensional attributes in a multidimensional space, such as a two dimensional geographic area. Using known systems to store a plurality of data objects with dimensional attributes would result in many data objects with dimensional attributes which are spatially close together in a multidimensional space being stored at different nodes. A range search of such multidimensional space based on dimensional attributes would be relatively slow and inefficient because many nodes would need to be queried in searching the respective data objects.

It would be desirable to provide a system and method to implement multidimensional range searches on top of a distributed data store. It would be further desirable that such system or method be configured to function effectively when dealing with non-uniformly distributed dimensional data, such as is typical of geographic location data. In order to support a distributed solution in which each storage node has its own data structure, memory, and/or disk, it would be desirable that data objects corresponding to dimensional attributes that are spatially close together according to the dimensions of a prospective range search be partitioned onto the same or relatively few storage nodes. For example, if a system is queried for location tagged data within a bounding area representing the city of San Francisco, it would be desirable that all data tagged within the city of San Francisco be stored in only a small number of storage nodes because all such nodes must be queried independently to compute a final result. Otherwise a large number of nodes must be queried and efficient computation cannot be guaranteed.

SUMMARY

The invention provides a computer-implemented method for managing a plurality of data objects including dimensional attributes. The method includes receiving a plurality of data objects including dimensional attributes and assigning each of a plurality of nodes to one or more of a plurality of keyspace positions of a keyspace, wherein the plurality of nodes define partitions of the keyspace. A space filling curve is applied to the dimensional attributes of each of the plurality of data objects to generate a plurality of key values which correspond to the plurality of keyspace positions, and each of the plurality of data objects is transmitted to one or more of the plurality of nodes assigned to a keyspace position corresponding to the key value of the respective data object.

The invention further provides a system for managing a plurality of data objects including dimensional attributes comprising at least one computing device including at least one memory comprising instructions operable to enable the computing device to perform a procedure. The procedure includes receiving a plurality of data objects including dimensional attributes and assigning each of a plurality of nodes to one or more of a plurality of keyspace positions of a keyspace, wherein the plurality of nodes define partitions of the keyspace. The procedure further includes applying a space filling curve to the dimensional attributes of each of the plurality of data objects to generate a plurality of key values which correspond to the plurality of keyspace positions, and transmitting each of the plurality of data objects to one or more of the plurality of nodes assigned to a keyspace position corresponding to the key value of the respective data object.

The invention further provides non-transitory computer-readable media tangibly embodying a program of instructions executable by a computing device to implement a method, the computing device being capable of interfacing with a communications network. The method includes receiving a plurality of data objects including dimensional attributes and assigning each of a plurality of nodes to one or more of a plurality of keyspace positions of a keyspace, wherein the plurality of nodes define partitions of the keyspace. The method further includes applying a space filling curve to the dimensional attributes of each of the plurality of data objects to generate a plurality of key values which correspond to the plurality of keyspace positions, and transmitting each of the plurality of data objects to one or more of the plurality of nodes assigned to a keyspace position corresponding to the key value of the respective data object.

BRIEF DESCRIPTION OF THE DRAWING(S)

The foregoing Summary as well as the following detailed description will be readily understood in conjunction with the appended drawings which illustrate preferred embodiments of the invention. In the drawings.

DETAILED DESCRIPTION OF THE PREFERRED EMBODIMENT(S)

Figure 1:
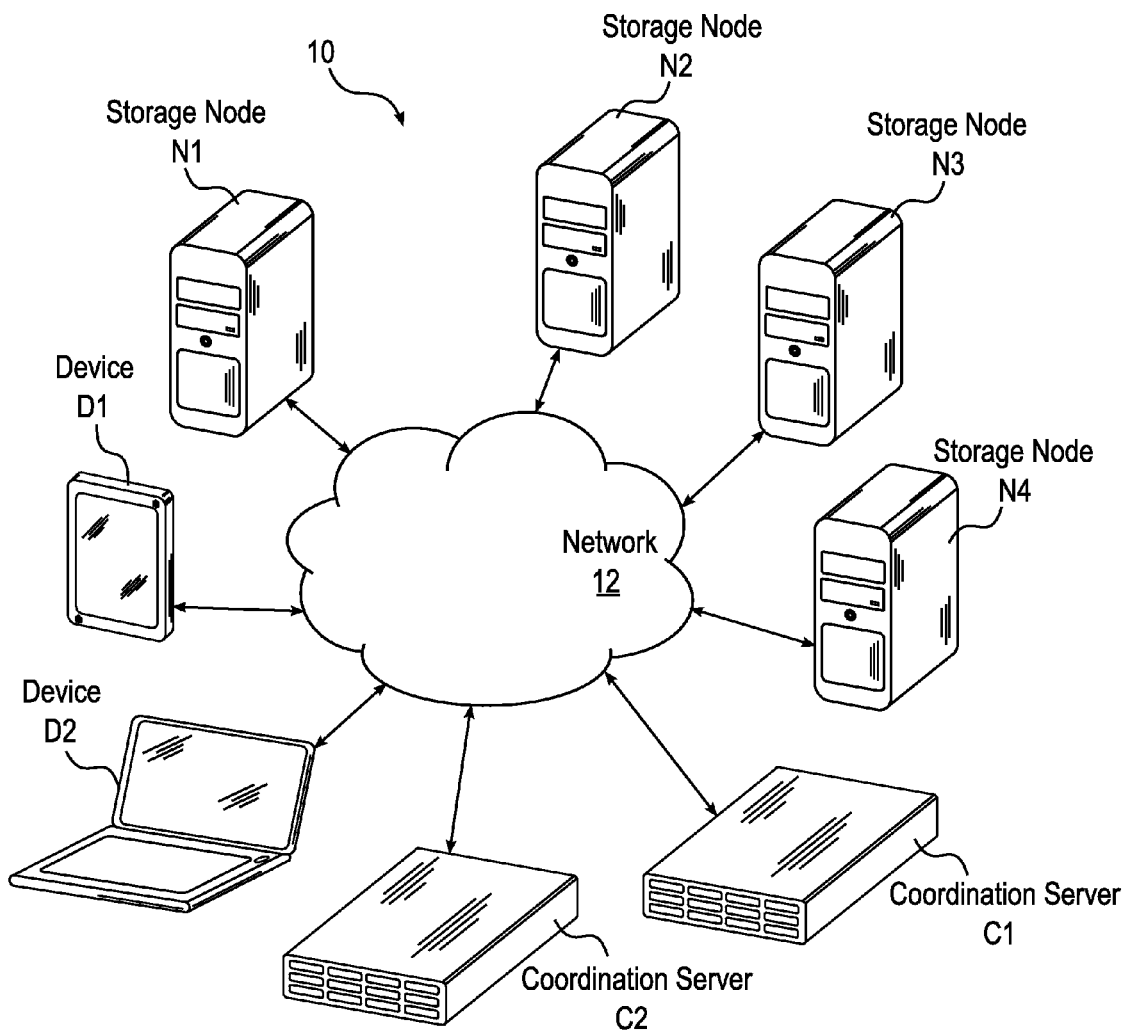
FIG. 1 is a schematic illustration of an exemplary operating environment in which multidimensional range search systems are operable according to a preferred embodiment of the invention.

The preferred embodiments of the invention are described below with reference to the drawing figures where like numerals represent like elements throughout.

Referring to FIG. 1, a schematic illustration is shown of an exemplary operating environment 10 in which preferred systems, in the form of first, second, third and fourth server storage nodes N1, N2, N3, N4, first and second devices D1, D2, and coordination servers C1, C2, communicate via a communication network 12. The server storage nodes N1, N2, N3, N4 and coordination servers C1, C2 each includes one or more computing devices and one or more memory devices, which computing devices and memory devices may be integrally constructed or connected in any suitable manner, for example via a network.

Figure 4A:
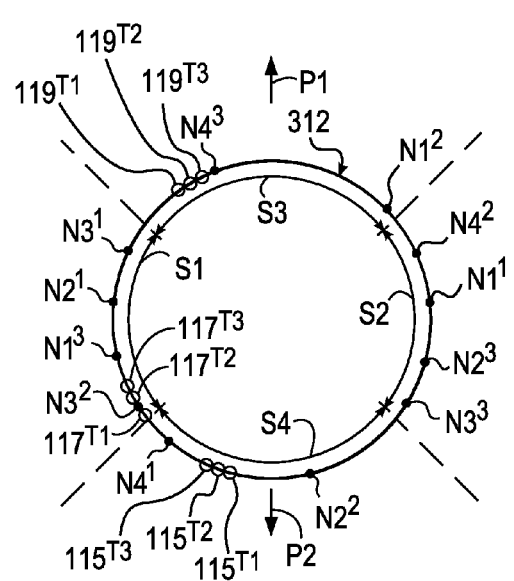
FIG. 4A is a diagram showing a keyspace in the form of a consistent hashing ring, including storage nodes non-uniformly assigned thereon, according to a preferred embodiment of the invention.
Figure 4B:
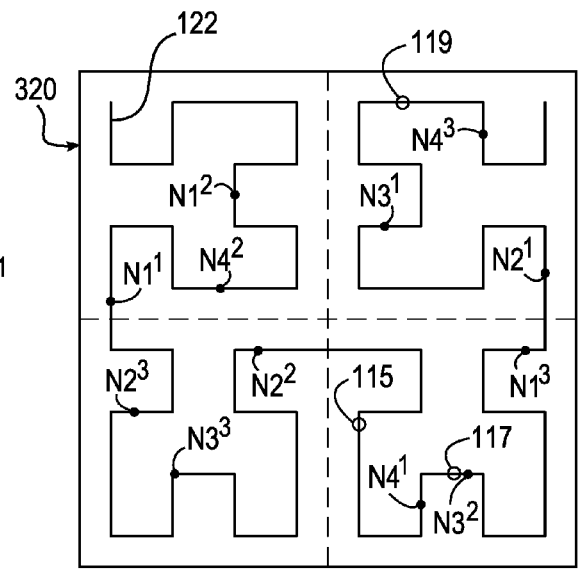
FIG. 4B is a diagram showing a mapping of the keyspace and storage nodes of FIG. 4A over a Hilbert Curve within a multidimensional space according to a preferred embodiment of the invention.
Figure 4C:
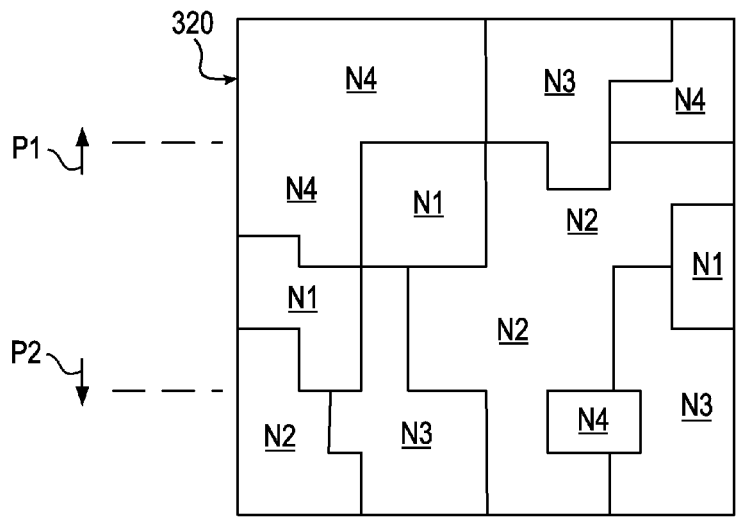
FIG. 4C is a diagram showing assigning of the storage nodes and virtual nodes of FIGS. 4A and 4B to partitioned areas within the multidimensional space of FIG. 4B according to a preferred embodiment of the invention.
Figure 5:
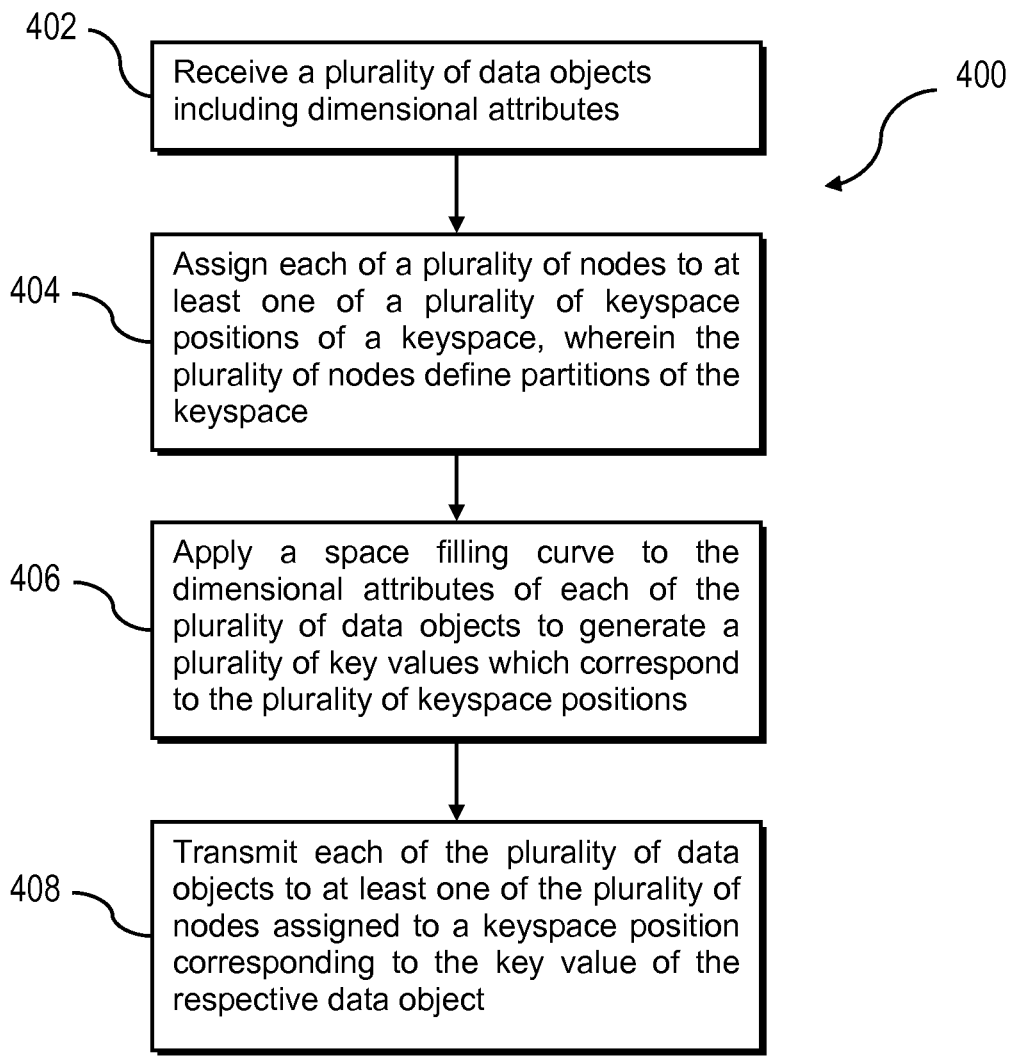
FIG. 5 is a flowchart showing a method for managing a plurality of data objects including dimensional attributes according to a preferred embodiment of the invention.

Referring to FIG. 5, a computer-implemented method 400 is shown for managing a plurality of data objects including dimensional attributes according to a preferred embodiment of the invention. The method 400 is described with reference to the preferred components shown in the operating environment 10 of FIG. 1, one or more of which components preferably include memory suitable for storing instructions for performance of the method 400. FIGS. 2A-2C, 3A-3C and 4A-4C provide examples of logic employed in the implementation of the method 400. The method 400 may alternatively be performed via other suitable system or systems, and the method is not limited by the provided example logic of FIGS. 2A-2C, 3A-3C and 4A-4C. The method 400 includes receiving a plurality of data objects including dimensional attributes (step 402). Each of a plurality of nodes is assigned to at least one of a plurality of keyspace positions of a keyspace, wherein the plurality of nodes define partitions of the keyspace (step 404). A space filling curve is applied to the dimensional attributes of each of the plurality of data objects to generate a plurality of key values which correspond to the plurality of keyspace positions (step 406). Each of the plurality of data objects are transmitted to at least one of the plurality of nodes assigned to a keyspace position corresponding to the key value of the respective data object (step 408).

Figure 2A:
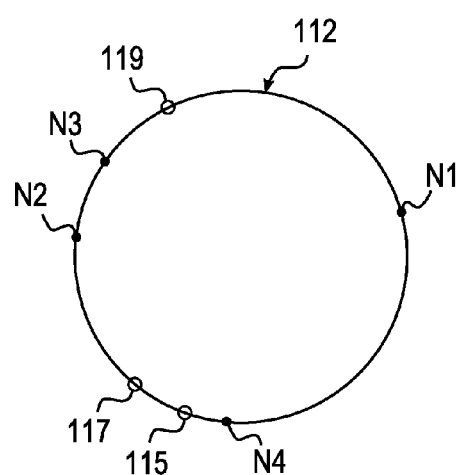
FIG. 2A is a diagram showing a keyspace in the form of a consistent hashing ring, including storage nodes assigned thereon, according to a preferred embodiment of the invention.

The plurality of nodes are preferably assigned to the plurality of keyspace positions using consistent hashing. Referring to FIG. 2A, a diagrammatic representation of a keyspace according to a preferred embodiment of the invention in the form of a consistent hashing ring 112 is shown. The consistent hashing ring 112 preferably includes a finite number of sequential keyspace positions evenly distributed around the consistent hashing ring 112 to which data objects can be assigned. Example first, second and third keyspace positions 115, 117, 119 are shown for reference purposes. The first, second, third and fourth server storage nodes N1, N2, N3, and N4 are assigned keyspace positions corresponding diagrammatically to positions on the consistent hashing ring 112, thereby partitioning the keyspace into four sections. Each storage node N1, N2, N3, and N4 is preferably configured for storing data objects corresponding to keyspace positions between the respective storage node position and the clockwise-next sequentially located storage node position on the consistent hashing ring 112. Referring to the example keyspace positions 115, 117, 119, fourth storage node N4 is configured to store data objects corresponding to the first and second example keyspace positions 115, 117 and the third storage node N3 is configured to store data objects corresponding to the third example keyspace position 119.

Figure 2B:
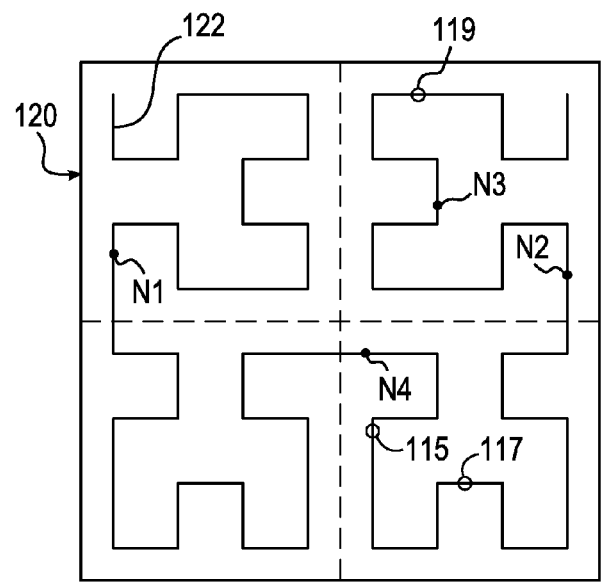
FIG. 2B is a diagram showing a mapping of the keyspace and storage nodes of FIG. 2A over a Hilbert Curve within a multidimensional space according to a preferred embodiment of the invention.

Referring to FIG. 2B, a diagrammatic representation of a two dimensional multidimensional space 120 in the form of a square is shown. The multidimensional space 120 can be representative of any two dimensional space, for example a geographic area defined by units of longitude and latitude or other suitable coordinates. The keyspace represented by the consistent hashing ring 112 is mapped over a space filling curve 122, which as shown is preferably a Hilbert Curve, within the multidimensional space 120. Alternatively, other suitable space filling curves may be employed, including but not limited to a Z-order curve. A diagrammatic representation of the relative positioning of the storage nodes N1, N2, N3, N4 and the example keyspace positions 115, 117, 119 are shown. Applying the space filling curve 122 to a data object's dimensional attributes, such as units of latitude and longitude or other suitable geographic coordinates for a geographic area, within the multidimensional space 120 generates a key value which corresponds to a keyspace position, such as one of the example first, second and third keyspace positions 115, 117, 119.

The received plurality of data objects in the method 400 preferably include dimensional attributes corresponding to a multidimensional space, for example a substantially complete mapping of a two dimensional area such as the multidimensional space 120. Alternatively, the received plurality of data objects include dimensional attributes corresponding to discrete positions within the multidimensional space, for example dimensional attributes only corresponding to one of the example first, second and third keyspace positions 115, 117, 119 of the multidimensional space 120. In a preferred embodiment of the invention, the data objects' dimensional attributes correspond to a two dimensional geographic area and/or geographic coordinates within a two dimensional geographic area. The data objects further preferably include descriptions of points of interest corresponding to respective geographic coordinates, such as descriptions including addresses, names of residents, business names, landmarks, notifications, and warnings.

Figure 2C:
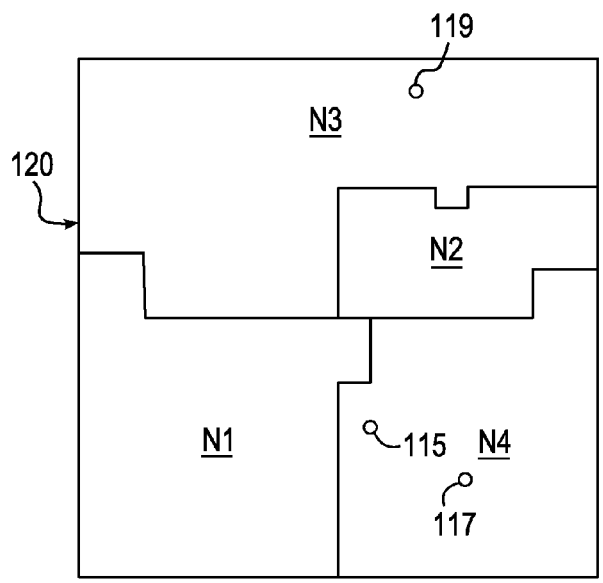
FIG. 2C is a diagram showing assigning of the storage nodes of FIGS. 2A and 2B to partitioned areas within the multidimensional space of FIG. 2B according to a preferred embodiment of the invention.

Referring to FIG. 2C, the multidimensional space 120 is shown partitioned into areas defined by the space filling curve 122, which areas correspond to the keyspace positions to which the respective storage nodes N1, N2, N3, N4 are assigned, based on the figurative placement of the storage nodes N1, N2, N3, N4 on the consistent hashing ring 112. As shown in FIG. 2C, with reference to the example keyspace positions 115, 117, 119, when a particular data object's dimensional attributes correspond to a particular partitioned area of the multidimensional space 120, the particular data object is stored in the storage node N1, N2, N3, N4 which corresponds to the particular partitioned area. The space filling curve 122 provides an effective way to map multiple dimensions onto a single dimension while ensuring that data objects that are spatially close together in multiple dimensions, such as a two dimensional geographic area, tend to be close together in a mapped single dimension at a keyspace position, and accordingly, a relatively fewer number of nodes correspond to data objects having closely spaced dimensional attributes.

Figure 6:
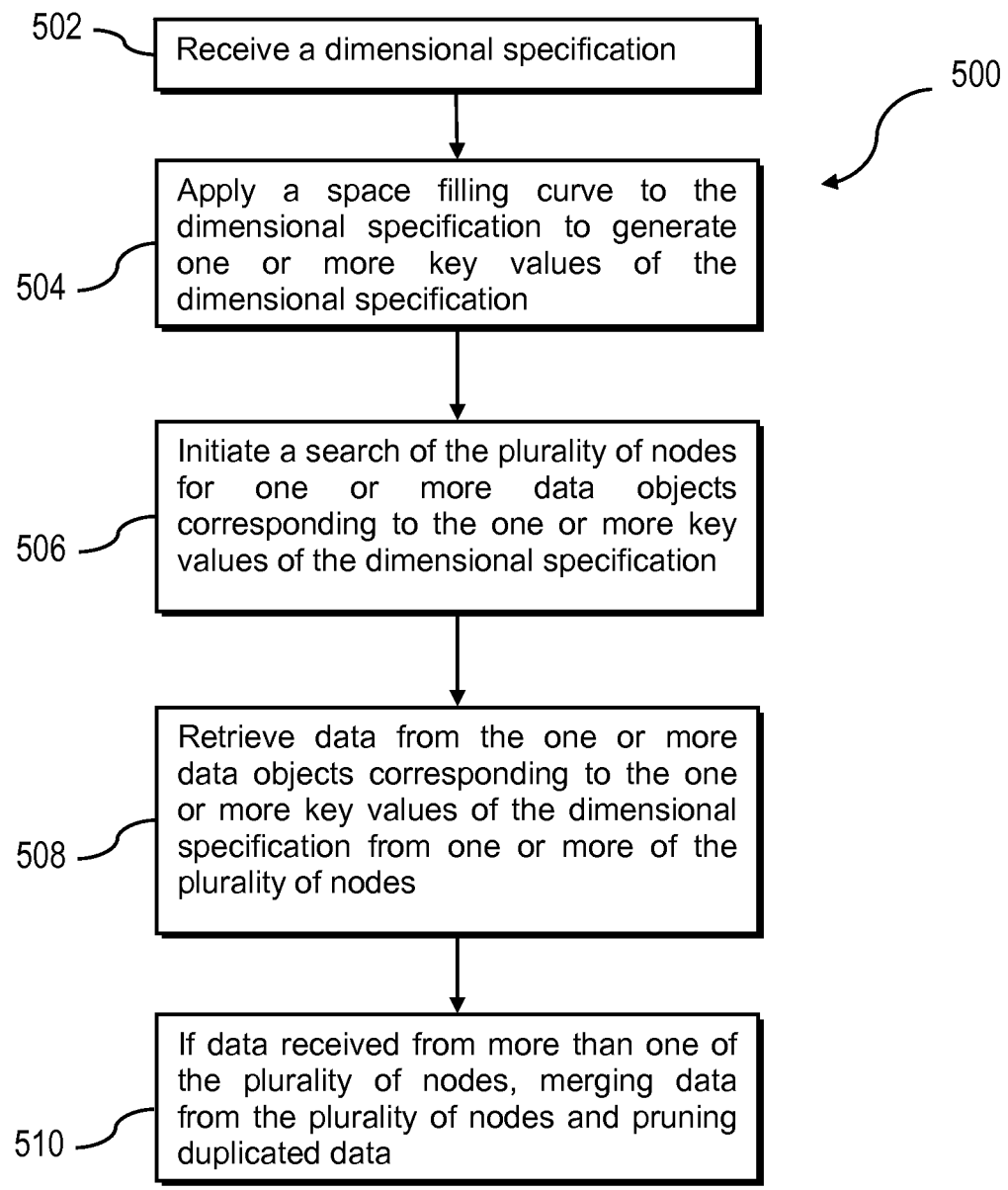
FIG. 6 is a flowchart showing a method for searching a plurality of data objects according to a preferred embodiment of the invention.

Preferably the plurality of data objects are stored at the corresponding plurality of storage nodes in a data structure which supports multidimensional range searching including but not limited to one or more of a B tree, B+ tree, k-d tree, k-d-b tree, and quadtree data structure. Referring to FIG. 6, a method 500 providing for a range search of the plurality of data objects stored pursuant to the method 400 at a plurality of storage nodes preferably proceeds as follows. A dimensional specification is received (step 502) and the space filling curve, in the example above the Hilbert space filling curve 122, is applied to the dimensional specification to generate one or more key values of the dimensional specification (step 504). The received dimensional specification preferably includes one or more bounding regions, such as a two dimensional portioned area of the multidimensional space 120. Alternatively, the received dimensional specification can correspond to one or more discrete coordinates. A search is initiated of the plurality of nodes, such as the example first, second, third and fourth server nodes N1, N2, N3, N4 for one or more data objects corresponding to the one or more key values corresponding to the dimensional specification (step 506), and data is retrieved from the one or more data objects corresponding to the one or more key values of the dimensional specification from one or more of the plurality of nodes (step 508). If data is received from more than one of the plurality of nodes, data from the plurality of nodes is preferably merged and duplicated data is preferably pruned (step 510).

The initiated range search method 500 can employ any suitable requirements including but not limited to: finding all data objects having key values corresponding to points within a specified bounding region or at a discrete coordinate of a multidimensional space, and finding all data objects meeting a predetermined criteria having key values corresponding to points within a specified bounding region or at a discrete coordinate of a multidimensional space. For example, for a multidimensional space representing the state of California, a dimensional specification including the area of the city of San Francisco can be received and key values generated via the relevant space filling curve. Server nodes assigned keyspace positions corresponding to generated key values can be searched for data objects meeting a predetermined criteria corresponding to the generated key values. Such predetermined criteria may include for example a criteria that retrieved data objects correspond to Chinese restaurants. The predetermined criteria can further include a time specification, for example, Chinese restaurants which have opened within the last 2 months.

Referring to the exemplary operating environment 10 of FIG. 1, the methods 400 and 500 can be performed by one or both of the coordination servers C1, C2 in communication with the first, second, third and fourth server storage nodes N1, N2, N3, N4 via the communication network 12 which can include one or more of a local area network ("LAN"), a wide area network ("WAN"), and a wireless telecommunication network. One or both of the coordination servers C1, C2 can receive search requests from first and second devices D1, D2 pursuant to the method 500, such as cellular mobile devices, personal computers, and application servers. Alternatively, in the case of a decentralized implementation of the methods 400 and 500, the coordination servers C1, C2 can be omitted, and one or more of the server storage nodes N1, N2, N3, N4 can be configured to perform the methods 400 and 500 in communication with each other as a peer-to-peer organized system. One skilled in the art will recognize that a system according to a preferred embodiment of the invention can include any suitable number of storage nodes and coordination servers, and support any suitable number of devices. In systems using coordination servers, it is preferred that at least two coordination servers are provided, such that failure of one server will not affect system operation.

Known Distributed Hash Table "DHT" systems typically generate keys by hashing data object values, which ensures a probabilistically uniform distribution of keys over the entire range of valid keys, and consequently, storage nodes typically share storage load fairly evenly. Key values generated for multidimensional range search according to a preferred embodiment of this invention come from a space filling curve and are not likely to be uniformly distributed unless the distribution of dimensional attributes is also uniform. For common scenarios, such as those involving geographic spatial data, distribution of dimensional attributes is not likely to be uniform, and storage nodes would be likely to have unbalanced load.

In a preferred embodiment of the invention, the above-described methods can further include assigning one or more of the plurality of nodes to a plurality of positions of a keyspace, whereby one of the plurality of nodes can define a plurality of partitions of the keyspace. By assigning one or more storage nodes multiple positions in a keyspace, the potential for a more balanced load among the storage nodes is increased. The distribution of extra node positions, which positions can be termed "virtual nodes", along a keyspace can also be effective to account for differing load capabilities of different storage nodes, for example nodes with different hardware. The more positions assigned a node within a keyspace, the greater the probability of an individual node handling a fair share of the data load.

Figure 3A:
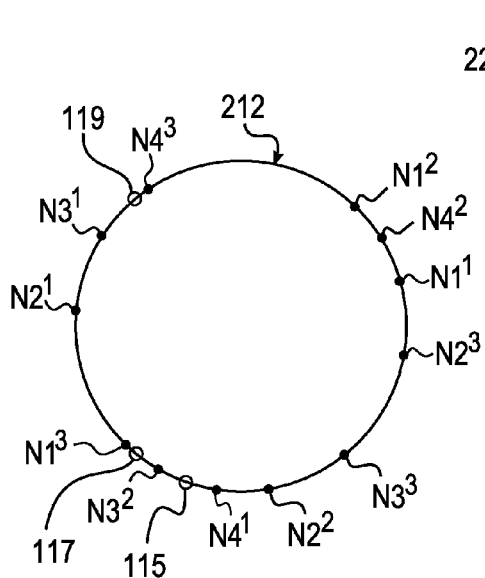
FIG. 3A is a diagram showing a keyspace in the form of a consistent hashing ring, including storage nodes, each assigned to multiple positions thereon, according to a preferred embodiment of the invention.

Referring to FIG. 3A, a diagrammatic representation of a keyspace according to a preferred embodiment of the invention in the form of a second consistent hashing ring 212 is shown. The consistent hashing ring 212 of FIG. 3A is identical to the consistent hashing ring 112 of FIG. 2A except that the storage nodes N1, N2, N3, N4 are each assigned three positions along the keyspace. First server storage node N1 is assigned to three positions, alternatively referred to as virtual nodes, $N1^1$, $N1^2$, $N1^3$. Second server storage node N2 is assigned three positions $N2^1$, $N2^2$, $N2^3$. Third server storage node N3 is assigned three positions $N3^1$, $N3^2$, $N3^3$. Fourth server storage node N4 is assigned three positions $N4^1$, $N4^2$, $N4^3$. Examples of the first, second and third keyspace positions 115, 117, 119 are shown for reference purposes on the consistent hashing ring 212 in the same relative position as shown on the consistent hashing ring 112 of FIG. 2A. Each storage node N1, N2, N3, and N4 is preferably configured for storing data objects corresponding to keyspace positions between the respective storage node position and the clockwise-next sequentially located storage node position on the consistent hashing ring 212. Referring to the example keyspace positions, fourth storage node N4 is configured to store data objects corresponding to the first example keyspace position 115, and the third storage node N3 is configured to store data objects corresponding to the second and third example keyspace positions 117, 119.

Figure 3B:
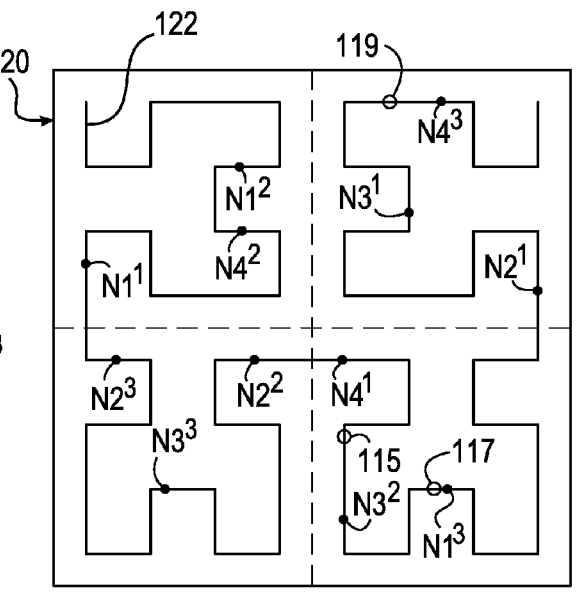
FIG. 3B is a diagram showing a mapping of the keyspace and storage nodes of FIG. 3A over a Hilbert Curve within a multidimensional space according to a preferred embodiment of the invention.
Figure 3C:
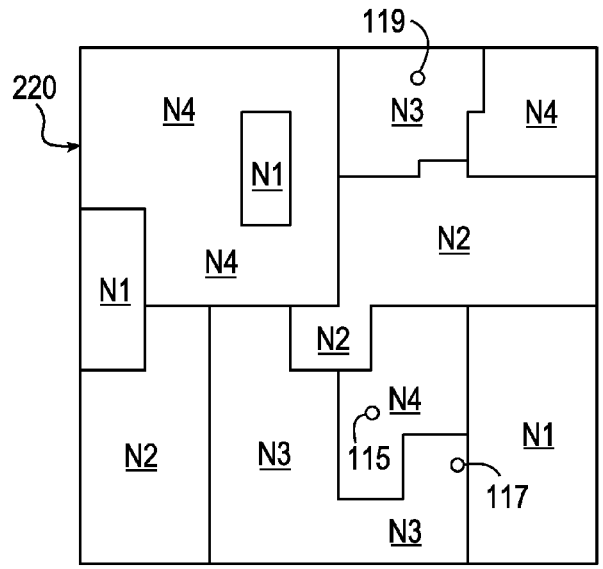
FIG. 3C is a diagram showing assigning of the storage nodes of FIGS. 3A and 3B to partitioned areas within the multidimensional space of FIG. 3B according to a preferred embodiment of the invention.

Referring to FIG. 3B, a diagrammatic representation of a two dimensional multidimensional space 220 in the form of a square is shown. The multidimensional space 220 of FIG. 3B is identical to the multidimensional space 120 of FIG. 2B except that the storage nodes N1, N2, N3, N4 are each assigned three positions along the keyspace and mapped accordingly over the space filling curve 122. A diagrammatic representation of the relative multiple positioning of the storage nodes N1, N2, N3, N4 and the example keyspace positions 115, 117, 119 are shown. Referring to FIG. 3C, the multidimensional space 220 is shown partitioned into areas defined by the space filling curve 122, which areas correspond to the storage nodes N1, N2, N3, N4, each figuratively assigned to three locations on the consistent hashing ring 212. As shown in FIG. 3C with reference to the example keyspace positions 115, 117, 119, when a particular data object's dimensional attributes correspond to a particular partitioned area of the multidimensional space 220, the particular data object is stored in the storage node N1, N2, N3, N4 which corresponds to the particular partitioned area. As shown, assigning multiple keyspace positions to the storage nodes N1, N2, N3, N4 permits a greater number of partitions in disparate portions of the multidimensional space 220, potentially spreading storage and computational requirements more evenly among the storage nodes N1, N2, N3, N4. The required number of keyspace positions and the assignment of storage nodes to keyspace positions can be determined via trial and error or based on an analysis of system data, using methods such as Monte Carlo methods with a representative data set.

Another preferred manner to increase the likelihood of a balanced load among storage nodes is to use a non-uniform random variable to assign storage nodes keyspace positions. In particular, it is preferred to use a random variable that with high probability assigns virtual nodes to key ranges with a high data density. Such a random variable is preferably constructed using sample data, using a suitable algorithm such as a Markov model, or by using a prior knowledge of data density. For example, in the case of spatial data corresponding to the geographic area of the planet earth, spatial data corresponding to human population density correlates strongly with latitude, so it would be beneficial to use a random variable that favors North American latitudes over Antarctic ones.

Referring to FIG. 4A, a diagrammatic representation of a keyspace according to a preferred embodiment of the invention in the form of a third consistent hashing ring 312 is shown. The consistent hashing ring 312 of FIG. 4A is identical to consistent hashing ring 112 of FIG. 2A except that the storage nodes N1, N2, N3, N4 are each assigned three positions along the keyspace, which positions are concentrated relatively more densely along a first span S1 and a second span S2 corresponding to a figurative equator of the consistent hashing ring 112, and which positions are concentrated relatively less densely along a third span S3 and a fourth span S4 corresponding to figurative first and second hash ring poles P1, P2. Such distribution is preferably achieved via a function implementing a non-uniform random variable. A non-uniform random variable is preferably chosen to follow an expected distribution of spatial data in a multidimensional space, such as a geographic area, such that key values with a larger probability of having data objects are more likely to be assigned to nodes corresponding to relatively lesser keyspace positions. Stated in an alternative manner, a function is configured so that the plurality of nodes N1, N2, N3, N4 are assigned on the basis of the probability of the occurrence of particular dimensional attributes corresponding to a particular key value, wherein nodes assigned to keyspace positions corresponding to a relatively higher probability of occurrence are greater than nodes assigned to keyspace positions associated with a relatively lower probability of occurrence. First server storage node N1 is assigned to three positions $N1^1$, $N1^2$, $N1^3$, alternatively referred to as virtual nodes. Second server storage node N2 is assigned three positions $N2^1$, $N2^2$, $N2^3$. Third server storage node N3 is assigned three positions $N3^1$, $N3^2$, $N3^3$. Fourth server storage node N4 is assigned three positions $N4^1$, $N4^2$, $N4^3$. Each storage node N1, N2, N3, and N4 is preferably configured for storing data objects corresponding to keyspace positions between the respective storage node position and the clockwise-next sequentially located storage node position.

Referring to FIG. 4B, a diagrammatic representation of a two dimensional multidimensional space 320 in the form of a square is shown. The multidimensional space 320 is identical to the multidimensional space 120 of FIG. 2B except that the storage nodes N1, N2, N3, N4 are each assigned three positions along the keyspace and mapped accordingly over the space filling curve 122. A diagrammatic representation of the relative multiple positioning of the storage nodes N1, N2, N3, N4 is shown for reference. Referring to FIG. 4C, the multidimensional space 320 is shown partitioned into areas defined by the space filling curve 122, which areas correspond to the storage nodes N1, N2, N3, N4, each figuratively positioned in three locations on the consistent hashing ring 312. FIG. 4C also shows an approximated positioning of the first and second hash ring poles P1, P2 relative to the multidimensional space 320. As shown, assigning multiple keyspace positions to the storage nodes N1, N2, N3, N4 at higher density in the first and second spans S1, S2 results in a greater number of partitioned areas in certain portions of the multidimensional space 320, potentially spreading storage and computational requirements more evenly among the storage nodes N1, N2, N3, N4 if those certain portions correspond to relatively higher density of dimensional data.

In a preferred embodiment of the invention, the above-described methods can further include receiving the plurality of data objects including time attributes in addition to the dimensional attributes. Thereafter, the plurality of key values are generated based on the time attributes of the plurality objects, in addition to application of the space filling curve to the dimensional attributes, wherein each key value corresponds to at least one dimensional attribute and at least one time attribute. A time attribute can correspond to a creation time of a data object, an update time of a data object, or any suitable time measurement associated with a data object. Alternatively, the plurality of data objects can include other attributes in addition to or in place of time attributes for generating key values. Using attributes such as time attributes in addition to the dimensional attributes for generating key values is especially useful if data objects are distributed non-uniformly spatially, such that data objects share identical or similar dimensional attributes, causing one key value to correspond to a significant number of data objects. If one key value corresponds to many data objects, efficient searching may be precluded and one or more storage nodes may bear excessive computational or storage loads. Where dimensional attributes correspond to geographic coordinates, attributes including a building floor or physical address in addition to a two dimensional geographic dimensional attribute can be used in generating the key values, since a single geographic coordinate by itself may correspond to many addresses, especially in an urban setting with tall buildings and dense populations.

Referring to FIG. 4B, example dimensional attributes of the first, second and third keyspace positions 115, 117, 119 are shown in relation to the space filling curve 122 within the multidimensional space 320. Referring to FIG. 4A, each dimensional attribute of the first, second and third keyspace positions 115, 117, 119 corresponds to a plurality of keyspace positions $115^{T1, T2, T3}$, $117^{T1, T2, T3}$, $119^{T1, T2, T3}$ for storing key values based on dimensional attributes and alternative attributes, such as time attributes. Preferably, as shown, the relative locations of keyspace positions $115^{T1, T2, T3}$, $117^{T1, T2, T3}$, $119^{T1, T2, T3}$ along the consistent hashing ring 112 are based on their dimensional attributes shown in FIG. 4B, and each dimensional attribute corresponds to a plurality of adjacent keyspace positions representing different alternative attributes, such as time attributes.

In one example, for a data object having dimensional attributes corresponding to the position 115 in the multidimensional space 320 of FIG. 4B, a key value corresponding to the keyspace position $115^{T1}$ is generated if the data object was created during a first predetermined time period. A key value corresponding to keyspace position $115^{T2}$ is generated if the data object was created during a second predetermined time period. A key value corresponding to keyspace position $115^{T3}$ is generated if the data object was created during a third predetermined time period. As shown by the example, the assigning of key values to data objects on the consistent hashing ring 312 is preferably primarily performed based on the mapping of the dimensional attributes via the space filling curve 122, and key values sharing a single dimensional attribute but different time attributes are arranged consecutively in the dimensionally-assigned position on the consistent hashing ring 312. Accordingly, the plurality of key values are generated based on the dimensional attributes comprising most significant bits of the plurality of key values and time attributes comprising least significant bits of the plurality of key values.

In another example, for a data object having dimensional attributes corresponding to the position 117 in the multidimensional space 320, a key value corresponding to keyspace position $117^{T1}$ is generated if the data object was created during a first predetermined time period, a key value corresponding to keyspace position $117^{T2}$ is generated if the data object was created during a second predetermined time period, a key value corresponding to keyspace position $117^{T3}$ is generated if the data object was created during a third predetermined time period. As depicted by the consistent hashing ring 312, key values corresponding to keyspace positions $117^{T1}$ are stored at the fourth node N4 and key values corresponding to keyspace position $117^{T2}$ and keyspace position $117^{T3}$ are stored at the third node N3. Storing data objects corresponding to identical spatial position in separate nodes as described with reference to keyspace positions $117^{T1, T2, T3}$ may be particularly desirable when a spatial position corresponds to many data objects, for example in the case where a plurality of data objects correspond to a same geographic coordinate. Pursuant to the example, a range search performed using the method 500 of FIG. 6 can include receiving a time specification in addition to a dimensional specification. For example, referring to FIG. 4B, the dimensional specification could include a dimensional range corresponding to position 115 though position 117, and referring to FIG. 4A, the time specification could include the time range corresponding to time T2 through time T3, whereby data objects corresponding to keyspace positions $115^{T2}$, $115^{T3}$, $117^{T2}$ and $117^{T3}$ would be returned. Time specifications can include, for example, within the day, week, month, or year, or prior to the day, week, month, or year. Alternatively, any suitable dimensional and time specifications can be searched.

The invention further provides non-transitory computer-readable media tangibly embodying a program of instructions executable by a computing device to implement a method, the computing device being capable of interfacing with a communications network. The method includes receiving a plurality of data objects including dimensional attributes and assigning each of a plurality of nodes to one or more of a plurality of keyspace positions of a keyspace, wherein the plurality of nodes define partitions of the keyspace. The method further includes applying a space filling curve to the dimensional attributes of each of the plurality of data objects to generate a plurality of key values which correspond to the plurality of keyspace positions, and transmitting each of the plurality of data objects to one or more of the plurality of nodes assigned to a keyspace position corresponding to the key value of the respective data object. As stated herein non-transitory computer-readable media comprises all computer-readable media except for a transitory, propagating signal.

While the preferred embodiments of the invention have been described in detail above, the invention is not limited to the specific embodiments described above, which should be considered as merely exemplary. Further modifications and extensions of the present invention may be developed, and all such modifications are deemed to be within the scope of the present invention as defined by the appended claims.

What is claimed is:

1. A computer-implemented method for managing a plurality of data objects including dimensional attributes to facilitate distribution of computational and storage loads, the method comprising:
    receiving a plurality of data objects including dimensional attributes;
    assigning each of a plurality of storage nodes to at least one of a plurality of keyspace positions of a keyspace, wherein the plurality of storage nodes define partitions of the keyspace wherein the plurality of storage nodes comprise a plurality of network-connectable computing devices;
    applying a space filling curve to the dimensional attributes of each of the plurality of data objects to generate a plurality of key values which correspond to the plurality of keyspace positions; and
    transmitting each of the plurality of data objects to at least one of the plurality of storage nodes assigned to a keyspace position corresponding to the key value of the respective data object;
    wherein the plurality of storage nodes are assigned to the plurality of keyspace positions based on a function including a non-uniform random variable, wherein the plurality of storage nodes are assigned on the basis of the probability of the occurrence of particular dimensional attributes corresponding to a particular key value, wherein storage nodes assigned to keyspace positions corresponding to a first probability of occurrence are greater than storage nodes assigned to keyspace positions associated with a second probability of occurrence, wherein the first probability is greater than the second probability.

2. The computer-implemented method of claim 1, further comprising storing each of the plurality of data objects at the corresponding plurality of storage nodes in a keyspace position corresponding to the key value of the respective data object.

3. The computer-implemented method of claim 1, further comprising storing each of the plurality of data objects at the corresponding plurality of storage nodes in a multidimensional range search structure in a keyspace position corresponding to the key value of the respective data object.

4. The computer-implemented method of claim 1, further comprising storing each of the plurality of data objects at the corresponding plurality of storage nodes in a multidimensional range search structure comprising at least one of a B tree, B+ tree, k-d tree, k-d-b tree, and a quadtree structure in a keyspace position corresponding to the key value of the respective data object.

5. The computer-implemented method of claim 1, wherein applying the space filling curve comprises applying a Hilbert curve to the dimensional attributes of each of the plurality of data objects to generate a plurality of corresponding key values.

6. The computer-implemented method of claim 1, further comprising:
receiving a dimensional specification;
applying the space filling curve to the dimensional specification to generate at least one key value of the dimensional specification;
initiating a search of the plurality of storage nodes for at least one data object corresponding to the at least one key value of the dimensional specification; and
retrieving data from the at least one data object corresponding to the at least one key value of the dimensional specification from at least one of the plurality of storage nodes.

7. The computer-implemented method of claim 6, further comprising receiving the dimensional specification as at least one bounding region.

8. The computer-implemented method of claim 6,
further comprising:
receiving predetermined criteria; and
retrieving data from the at least one data object corresponding to the at least one key value of the dimensional specification and the predetermined criteria from at least one the plurality of storage nodes.

9. The computer-implemented method of claim 1, further comprising:
receiving a dimensional specification;
applying the space filling curve to the dimensional specification to generate a plurality of specification key values of the dimensional specification;
initiating a search of the plurality of storage nodes for a plurality of data objects corresponding to the plurality of specification key values;
retrieving data from the plurality of data objects corresponding to the plurality of specification key values from the plurality of storage nodes; and
merging data from the plurality of storage nodes and pruning duplicated data.

10. A computer-implemented method for managing a plurality of data objects including dimensional attributes to facilitate distribution of computational and storage loads, the method comprising:
receiving a plurality of data objects including dimensional attributes corresponding to at least one of a two dimensional geographic area and geographic coordinates within the geographic area;
assigning each of a plurality of storage nodes to at least one of a plurality of keyspace positions of a keyspace, wherein the plurality of storage nodes define partitions of the keyspace wherein the plurality of storage nodes comprise a plurality of network-connectable computing devices;
applying a space filling curve to the dimensional attributes of each of the plurality of data objects to generate a plurality of key values which correspond to the plurality of keyspace positions; and
transmitting each of the plurality of data objects to at least one of the plurality of storage nodes assigned to a keyspace position corresponding to the key value of the respective data object.

11. The computer-implemented method of claim 10, wherein at least one of the plurality of storage nodes is assigned to at least two of the plurality of keyspace positions.

12. The computer-implemented method of claim 10, further comprising assigning the plurality of storage nodes to the plurality of keyspace positions based on a function including a non-uniform random variable.

13. The computer-implemented method of claim 1, further comprising assigning at least one of the plurality of storage nodes to a plurality of positions of the keyspace, whereby one of the plurality of storage nodes can define a plurality of the keyspace partitions.

14. The computer-implemented method of claim 1, further comprising receiving the plurality of data objects with dimensional attributes corresponding to at least one of a multidimensional space and positions within the multi-dimensional space.

15. The computer-implemented method of claim 1, further comprising:
receiving the plurality of data objects further including alternative attributes;
generating the plurality of key values further based on the alternative attributes of the plurality objects, wherein each key value corresponds to at least one dimensional attribute and at least one alternative attribute.

16. A computer-implemented method for managing a plurality of data objects including dimensional attributes to facilitate distribution of computational and storage loads, the method comprising:
receiving a plurality of data objects including dimensional attributes;
assigning each of a plurality of storage nodes to at least one of a plurality of keyspace positions of a keyspace, wherein the plurality of storage nodes define partitions of the keyspace wherein the plurality of storage nodes comprise a plurality of network-connectable computing devices, and wherein at least one of the plurality of storage nodes is assigned to a plurality of positions of the keyspace at a particular time, whereby one of the plurality of storage nodes can define a plurality of the keyspace partitions;
applying a space filling curve to the dimensional attributes of each of the plurality of data objects to generate a plurality of key values which correspond to the plurality of keyspace positions; and
transmitting each of the plurality of data objects to at least one of the plurality of storage nodes assigned to a keyspace position corresponding to the key value of the respective data object.

17. The computer-implemented method of claim 1, further comprising assigning the plurality of storage nodes to the plurality of keyspace positions using consistent hashing.

18. The computer-implemented method of claim 10, further comprising receiving the plurality of data objects with dimensional attributes corresponding to geographic coordinates within a geographic area and with descriptions of points of interest corresponding to respective ones of the geographic coordinates.

19. A computer-implemented method for managing a plurality of data objects including dimensional attributes to facilitate distribution of computational and storage loads, the method comprising:
   receiving a plurality of data objects including spatial dimensional attributes and time attributes;
   assigning each of a plurality of storage nodes to at least one of a plurality of keyspace positions of a keyspace, wherein the plurality of storage nodes define partitions of the keyspace wherein the plurality of storage nodes comprise a plurality of network-connectable computing devices;
   applying a space filling curve to the dimensional attributes of each of the plurality of data objects to generate a plurality of key values which correspond to the plurality of keyspace positions, wherein generating the plurality of key values based on the time attributes of the plurality objects, wherein each key value corresponds to at least one spatial dimensional attribute and at least one time attribute; and
   transmitting each of the plurality of data objects to at least one of the plurality of storage nodes assigned to a keyspace position corresponding to the key value of the respective data object.

20. The computer-implemented method of claim 19, wherein each of the time attributes corresponds to at least one of a creation time and an update time of the data object attribute.

21. The computer-implemented method of claim 19, further comprising generating the plurality of key values based on the dimensional attributes comprising most significant bits of the plurality of key values and time attributes comprising least significant bits of the plurality of key values.

22. The computer-implemented method of claim 19, further comprising:
   receiving a dimensional specification and a time specification;
   applying the space filling curve to the dimensional specification to generate at least one key value of the dimensional specification and the time specification;
   initiating a search of the plurality of storage nodes for at least one data object corresponding to the at least one key value of the dimensional specification and the time specification; and
   retrieving data from the at least one data object corresponding to the at least one key value of the dimensional specification and the time specification from at least one the plurality of storage nodes.

23. A system for managing a plurality of data objects including dimensional attributes to facilitate distribution of computational and storage loads, the system comprising at least one computing device including at least one memory comprising instructions operable to enable the computing device to perform a procedure comprising:
   receiving a plurality of data objects including dimensional attributes;
   assigning each of a plurality of storage nodes to at least one of a plurality of keyspace positions of a keyspace, wherein the plurality of storage nodes define partitions of the keyspace wherein the plurality of storage nodes comprise a plurality of network-connectable computing devices;
   applying a space filling curve to the dimensional attributes of each of the plurality of data objects to generate a plurality of key values which correspond to the plurality of keyspace positions; and
   transmitting each of the plurality of data objects to at least one of the plurality of storage nodes assigned to a keyspace position corresponding to the key value of the respective data object;
   wherein the plurality of storage nodes are assigned to the plurality of keyspace positions based on a function including a non-uniform random variable, wherein the plurality of storage nodes are assigned on the basis of the probability of the occurrence of particular dimensional attributes corresponding to a particular key value, wherein storage nodes assigned to keyspace positions corresponding to a first probability of occurrence are greater than storage nodes assigned to keyspace positions associated with a second probability of occurrence, wherein the first probability is greater than the second probability.

24. The system of claim 23, wherein the at least one computing device comprises the plurality of storage nodes.

25. The system of claim 24, wherein the plurality of storage nodes comprises a plurality of server storage nodes connected to each other via at least one of a Local Area Network (LAN) and a Wide Area Network (WAN).

26. The system of claim 25, wherein the plurality of storage nodes comprises a plurality of server storage nodes and a coordination server connected to each other via at least one of a LAN and a WAN.

* * * * *

UNITED STATES PATENT AND TRADEMARK OFFICE
CERTIFICATE OF CORRECTION

PATENT NO. : 8,819,076 B2
APPLICATION NO. : 12/850975
DATED : August 26, 2014
INVENTOR(S) : Myers et al.

Page 1 of 1

It is certified that error appears in the above-identified patent and that said Letters Patent is hereby corrected as shown below:

IN THE CLAIMS

In claim 19, at column 13, line 20, between the words "values" and "based" insert the word --is--.

Signed and Sealed this
Fourteenth Day of June, 2016

Michelle K. Lee
*Director of the United States Patent and Trademark Office*